United States Patent
Hwang et al.

(10) Patent No.: US 11,093,927 B2
(45) Date of Patent: Aug. 17, 2021

(54) SENSORY DATA COLLECTION IN AN AUGMENTED REALITY SYSTEM

(71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 15/472,560

(22) Filed: Mar. 29, 2017

(65) Prior Publication Data
US 2018/0285854 A1    Oct. 4, 2018

(51) Int. Cl.
*G06Q 20/32* (2012.01)
*H04Q 9/00* (2006.01)
(Continued)

(52) U.S. Cl.
CPC ......... *G06Q 20/322* (2013.01); *A63F 13/213* (2014.09); *A63F 13/215* (2014.09); *A63F 13/216* (2014.09); *A63F 13/35* (2014.09); *A63F 13/533* (2014.09); *A63F 13/5375* (2014.09); *A63F 13/92* (2014.09); *G06K 9/00671* (2013.01); *G06Q 20/3224* (2013.01); *G06T 11/60* (2013.01); *H04N 7/183* (2013.01); *H04Q 9/00* (2013.01); *H04M 1/72427* (2021.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 7,667,596 B2* | 2/2010 | Ozdemir | ........... | G08B 13/196 340/539.22 |
| 7,698,392 B2* | 4/2010 | Zapata | ........... | G06F 8/65 709/220 |

(Continued)

FOREIGN PATENT DOCUMENTS

WO    2011084720 A2    7/2011

OTHER PUBLICATIONS

Colangelo, Anthony, "The Conspiracy Theory Freaking Out Pokemon Go Players", https://web.archive.org/web/20161012105724/http://thenewdaily.com.au/life/tech/2016/07/12/pokemon-go-cia-conspiracy/, Jul. 12, 2016.
(Continued)

*Primary Examiner* — Motilewa Good Johnson
(74) *Attorney, Agent, or Firm* — Teddi E. Maranzano

(57) ABSTRACT

An augmented reality system collects sensory data from one or more user devices in a manner that is transparent to the user's augmented reality experience. A customer of an augmented reality system requests sensory data at a specified location. The augmented reality system modifies the augmented reality experience for one or more users to move someone to the specified location. The user device(s) collect the sensory data at the specified location in a manner that is transparent to the augmented reality experience of the user(s). The sensory data is uploaded from the user device(s) to the augmented reality system, which sends the sensory data to the customer.

11 Claims, 10 Drawing Sheets

(51) Int. Cl.

| | | |
|---|---|---|
| G06K 9/00 | (2006.01) | |
| G06T 11/60 | (2006.01) | |
| A63F 13/213 | (2014.01) | |
| A63F 13/215 | (2014.01) | |
| A63F 13/533 | (2014.01) | |
| A63F 13/5375 | (2014.01) | |
| H04N 7/18 | (2006.01) | |
| A63F 13/92 | (2014.01) | |
| A63F 13/35 | (2014.01) | |
| H04M 1/72427 | (2021.01) | |
| A63F 13/216 | (2014.01) | |

(52) U.S. Cl.
CPC ..... *H04M 2250/52* (2013.01); *H04Q 2209/60* (2013.01)

(56) References Cited

U.S. PATENT DOCUMENTS

| | | | | |
|---|---|---|---|---|
| 8,287,383 | B1* | 10/2012 | Etter | A63F 13/87 463/42 |
| 8,813,111 | B2* | 8/2014 | Guerin | A63F 13/44 725/19 |
| 8,814,691 | B2* | 8/2014 | Haddick | G02B 27/017 463/42 |
| 8,953,022 | B2* | 2/2015 | McArdle | H04N 21/23412 348/46 |
| 8,968,099 | B1 | 3/2015 | Hanke et al. | |
| 9,088,625 | B1* | 7/2015 | Moczydlowski | H04L 67/32 |
| 9,153,074 | B2* | 10/2015 | Zhou | G06F 1/163 |
| 9,239,849 | B2* | 1/2016 | Forutanpour | H04W 4/026 |
| 9,374,438 | B2* | 6/2016 | Demsey | H04L 67/2842 |
| 9,544,379 | B2* | 1/2017 | Gauglitz | G06Q 30/06 |
| 9,674,290 | B1* | 6/2017 | Rincon | H04L 51/20 |
| 9,801,018 | B2* | 10/2017 | Zimerman | H04W 4/021 |
| 10,275,943 | B2* | 4/2019 | Choi | G06T 19/006 |
| 2008/0172288 | A1 | 7/2008 | Pilskalns et al. | |
| 2010/0009700 | A1 | 1/2010 | Camp, Jr. et al. | |
| 2010/0211431 | A1* | 8/2010 | Lutnick | G06Q 30/02 705/14.12 |
| 2010/0257252 | A1* | 10/2010 | Dougherty | G06T 19/006 709/217 |
| 2011/0143776 | A1 | 6/2011 | Shankaranarayanan et al. | |
| 2011/0313779 | A1* | 12/2011 | Herzog | G06Q 10/10 705/1.1 |
| 2012/0116911 | A1* | 5/2012 | Irving | G06Q 30/02 705/26.4 |
| 2012/0116923 | A1* | 5/2012 | Irving | G06Q 30/0609 705/27.1 |
| 2012/0123806 | A1* | 5/2012 | Schumann, Jr. | G08G 1/096775 705/4 |
| 2012/0315884 | A1* | 12/2012 | Forutanpour | H04W 4/026 455/414.2 |
| 2012/0315992 | A1* | 12/2012 | Gerson | H04L 67/08 463/42 |
| 2013/0095855 | A1* | 4/2013 | Bort | G06T 17/05 455/456.2 |
| 2013/0138461 | A1* | 5/2013 | Shahraray | G06Q 10/06 705/7.12 |
| 2013/0222369 | A1 | 8/2013 | Huston et al. | |
| 2013/0300821 | A1* | 11/2013 | Lankford | H04N 21/00 348/14.08 |
| 2014/0304335 | A1* | 10/2014 | Fung | H04L 67/38 709/204 |
| 2015/0120408 | A1* | 4/2015 | Liu | H04W 4/021 705/14.12 |
| 2015/0154851 | A1* | 6/2015 | Vincent | G06F 16/9537 340/539.13 |
| 2015/0156460 | A1* | 6/2015 | Szybalski | G06K 9/00476 348/143 |
| 2015/0324636 | A1* | 11/2015 | Bentley | G11B 27/17 386/227 |
| 2016/0012133 | A1* | 1/2016 | Shim | G06Q 10/10 707/741 |
| 2016/0155187 | A1* | 6/2016 | Paulrajan | G06Q 30/0643 705/27.2 |
| 2016/0196570 | A1* | 7/2016 | Weingarden | G06Q 30/0214 705/14.16 |
| 2016/0322078 | A1* | 11/2016 | Bose | G11B 27/031 |
| 2016/0328885 | A1* | 11/2016 | Soon-Shiong | G06T 19/006 |
| 2016/0354688 | A1* | 12/2016 | Harkham | A63F 13/35 |
| 2017/0034470 | A1* | 2/2017 | Kleinrock | H04L 67/12 |
| 2017/0070521 | A1* | 3/2017 | Bailey | H04L 63/1416 |
| 2017/0337747 | A1* | 11/2017 | Hull | G06T 19/20 |
| 2018/0069817 | A1* | 3/2018 | Constantinides | H04L 51/20 |
| 2018/0203503 | A1* | 7/2018 | Chehade | H04L 67/32 |
| 2019/0236631 | A1* | 8/2019 | Schwartz | H04W 4/20 |

OTHER PUBLICATIONS

Close, Kerry, "Pokemon Go Is Good Business for Small Businesses", http://time.com/money/4402662/pokemon-go-small-business/, Jul. 12, 2016.
Disclosed Anonymously, "Method of Real-Time Littering Report", IPCOM 000239275, Oct. 24, 2014.
Poon, Linda, "Donating Your Selfies to Science", http://www.citylab.com/tech/2016/02/photo-share-social-media-instagram-google-street-view-urban-life-airtick/462495/, Feb. 12, 2016.
Nagata et al., "SakuraSensor: A Participatory Sensing SYstem for Detecting Flowering Cherries with Car-Mounted Smartphones", www.hotmobile.org/2015/papers/posters/Nagata.pdf, 2015.
Tuite et al., "PhotoCity: Training Experts at Large-scale Image Acquisition Through a Competitive Game", homes.cs.washington.edu/~ktuite/photocity-chi2011.pdf, May 2011.
Bell et al., "Eyespy: Supporting Navigation through Play", bbproj.sics.se/mypapers/EyeSpyCameraReady.pdf, Apr. 2009.
Yan et al, "CrowdSearch: Exploiting Crowds for Accurate Real-time Image Search on Mobile Phones", bbproj.sics.se/mypapers/EyeSpyCameraReady.pdf, MobiSys'10, Jun. 2010.
Kawajiri et al., "Steered Crowdsensing: Incentive Design towards Quality-Oriented Place-Centric Crowdsensing", Proceedings of the 2014 ACM International Joint Confenence on Pervasive and Ubiquitous Computing, p. 691-701, Sep. 2014.

\* cited by examiner

SENSORY DATA COLLECTION IN AN AUGMENTED REALITY SYSTEM

BACKGROUND

1. Technical Field

This disclosure generally relates to networked computer systems, and more specifically relates to augmented reality systems.

2. Background Art

Augmented reality systems are gaining popularity. An augmented reality system is one where a user's perception of the real world is augmented with computer-generated things. Pokemon Go is an example of an augmented reality game that became very popular in 2016. Pokemon Go is a registered trademark of Nintendo Co., Ltd. A player downloads the Pokemon Go app on a phone or other mobile device, then the game directs the player to go to locations where there is a Pokemon figure. When the player gets close, the app uses the camera on the device to allow the user to look at their surroundings. When the player points the camera in the device in the direction of where the system has placed the Pokemon character, the Pokemon character appears on the screen interposed on the camera display. The normal camera display is thus augmented with a computer-generated Pokemon character. The player may then take action to capture the Pokemon character, such as throwing a ball at the character in the game.

SUMMARY

An augmented reality system collects sensory data from one or more user devices in a manner that is transparent to the user's augmented reality experience. A customer of an augmented reality system requests sensory data at a specified location. The augmented reality system modifies the augmented reality experience for one or more users to move someone to the specified location. The user device(s) collect the sensory data at the specified location in a manner that is transparent to the augmented reality experience of the user(s). The sensory data is uploaded from the user device(s) to the augmented reality system, which sends the sensory data to the customer.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

DETAILED DESCRIPTION

The disclosure and claims herein relate to an augmented reality system that collects sensory data from one or more user devices in a manner that is transparent to the user's augmented reality experience. A customer of an augmented reality system requests sensory data at a specified location. The augmented reality system modifies the augmented reality experience for one or more users to move someone to the specified location. The user device(s) collect the sensory data at the specified location in a manner that is transparent to the augmented reality experience of the user(s). The sensory data is uploaded from the user device(s) to the augmented reality system, which sends the sensory data to the customer. The augmented reality system can charge the customer according to a score of the request. The augmented reality system can thus provide a new revenue stream to the provider of the augmented reality system by selling sensory data to customers by adjusting the augmented reality experience of one or more users to collect the requested sensory data.

Figure 1:
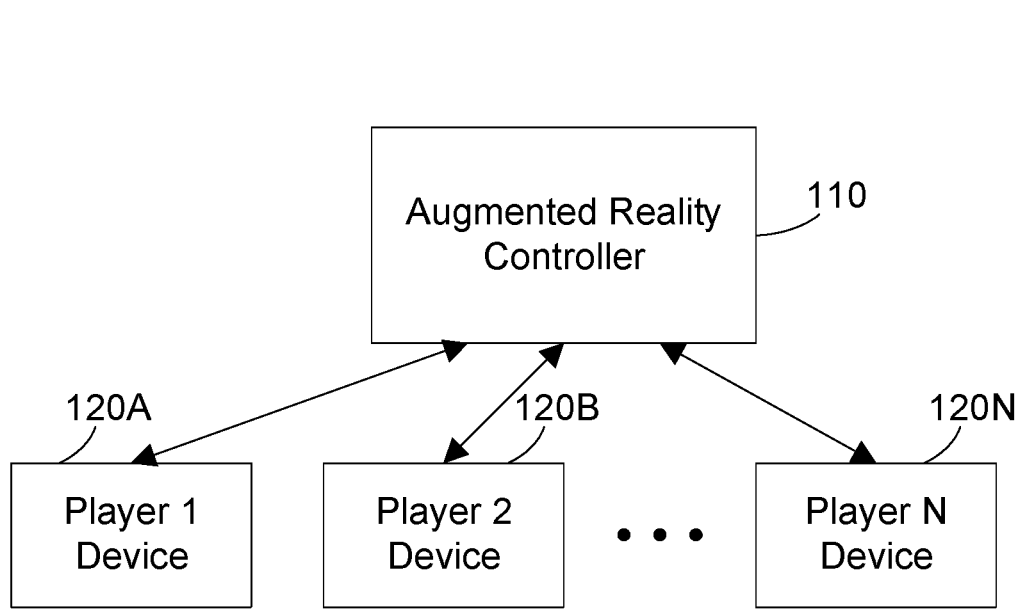
FIG. 1 is a block diagram of an augmented reality system that includes an augmented reality controller communicating with multiple player devices.

FIG. 1 shows a sample augmented reality system 100 that includes an augmented reality controller 110 connected to multiple player devices 120, shown in FIG. 1 as 120A, 120B, . . . , 120N. System 100 could be representative, for example, of the Pokemon Go augmented reality system, where the player devices are mobile devices and the augmented reality controller 110 is the central system that controls how the Pokemon Go game is played by the players. When the players 120 play Pokemon Go, they look through the camera on their device to locate a Pokemon character. The augmented reality controller 110 augments the normal camera view with a Pokemon character when the player points the camera at a location where there is a Pokemon character, according to the augmented reality controller 110.

Figure 2:
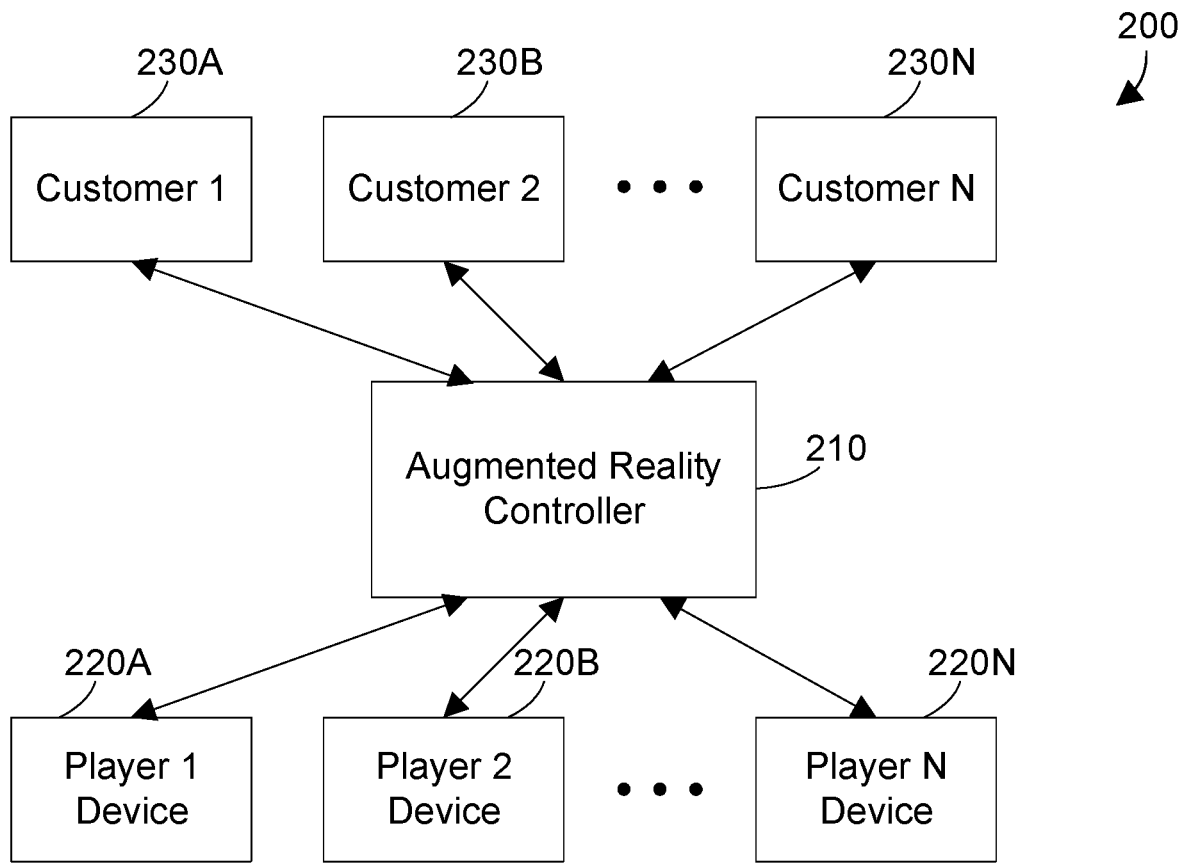
FIG. 2 is a block diagram of an augmented reality system that includes an augmented reality controller that communicates with multiple player devices and multiple customers.

Because the device camera is on when a player is playing the game, this allows capturing photos in a way that is transparent or mostly transparent to the user's gaming experience. The capability of capturing photos on a player's device, and the capability of directing players to certain locations, gives rise to the ability to sell photos or other sensory data to customers. An augmented reality system 200 is shown in FIG. 2 to include an augmented reality controller 210 that interacts with players 220, shown in FIG. 2 as 220A, 220B, ..., 220N. The augmented reality controller 210 also interacts with one or more customers 230, shown in FIG. 2 as 230A, 230B, ..., 230N. When a customer wants to obtain sensory data, such as photos or sound, at a specified location, the customer can make a request to the augmented reality controller 210, which can then modify the game play of one or more players to collect the requested sensory data, which can be sold to the requesting customer. The collection of the sensory data is preferably transparent to the user's gaming experience, and therefore adds an additional revenue stream to the provider of the augmented reality controller in a way that does not impact the quality of game play.

Figure 3:
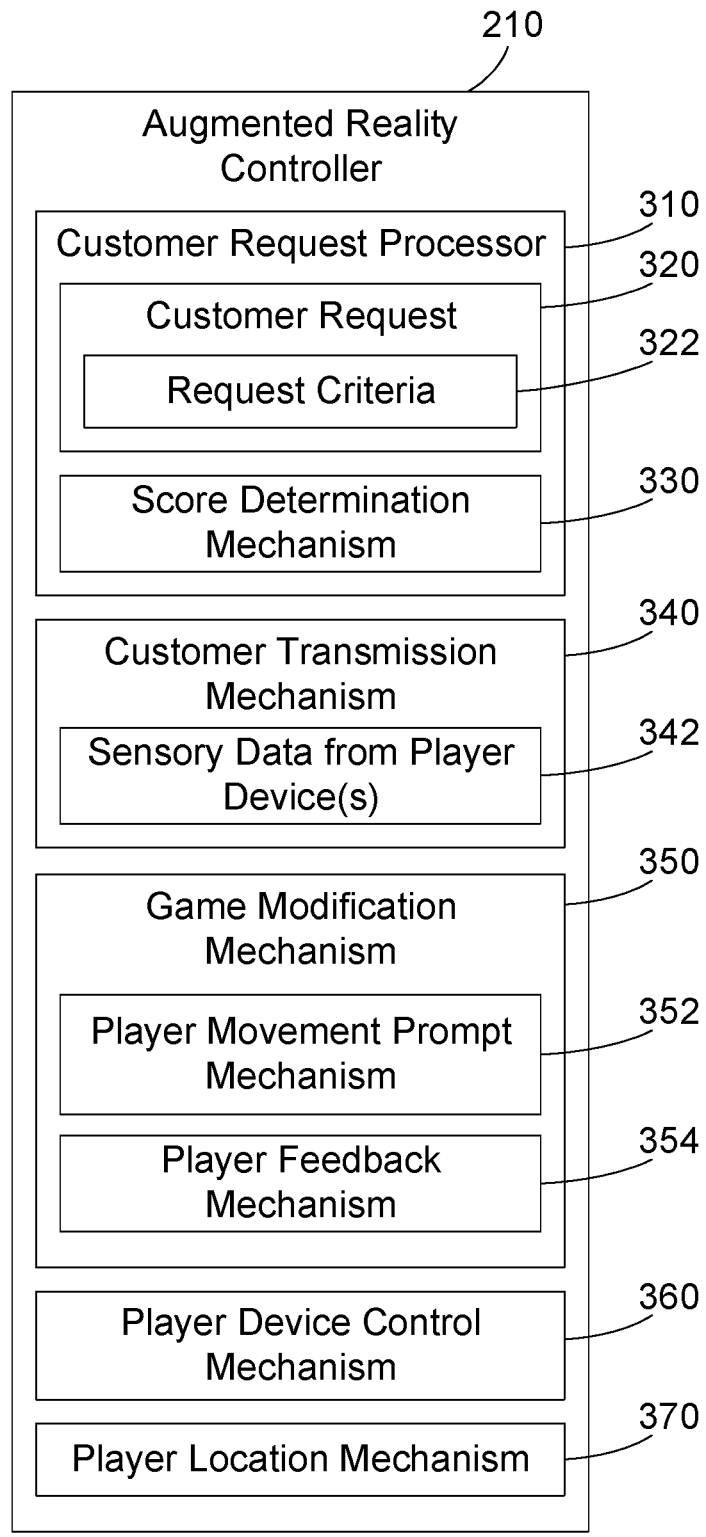
FIG. 3 is a block diagram of some possible features in the augmented reality controller shown in FIG. 2.

The augmented reality controller 210 may include many different features, some of which are shown in FIG. 3 by way of example. The augmented reality controller 210 may include a customer request processor 310, a customer transmission mechanism 340, a game modification mechanism 350, a player device control mechanism 360, and a player location mechanism 370. The customer request processor 310 receives a customer request 320, which includes request criteria 322 that specifies the location of the sensory data to be collected, as well as any other suitable criteria, as discussed in more detail below. The customer request processor 310 also includes a score determination mechanism 330 that determines a score for a customer request 320. The score determination mechanism 330 may determine a score using any suitable method. For example, the score determination mechanism 330 could have a score schedule that varies according to the type and quantity of data collected, the time deadline for collecting the data, etc. The score determination mechanism 330 may also take into account various factors in the augmented reality controller, such as whether the specified location in the customer request is remote from any players, whether the augmented reality controller recently had players in the same specified locations, how the augmented reality controller motivates players to captivate sensory data, etc. For example, placing a rare in-game item may allow for better coverage and faster response time because players will be very motivated to capture rare items, so the score determination mechanism could generate a higher score for such items. The score determination mechanism 330 may have a score schedule that has a default amount that is increased when certain factors exist. The score determination mechanism 330 broadly encompasses any suitable way to determine a score for a customer request 320.

The customer transmission mechanism 340 takes sensory data from one or more player devices 342 and transmits that data to a customer in response to the customer request 320. The game modification mechanism 350 includes a player movement prompt mechanism 352 and a player feedback mechanism 354. The player movement prompt mechanism 352 can direct the player to a location in a customer request 320. The player feedback mechanism 354 can modify the game play for the player when additional sensory data needs to be collected, such as when the collected sensory data was insufficient.

The player device control mechanism 360 interacts with player devices to control how the players play the augmented reality game. Player device control mechanism 360 preferably interacts with an app on a player device to control the function of the player device in some manner. For example, when the requested sensory data is photographs, the player device control mechanism 360 instructs the app on the player's device to automatically take photographs as the player plays the game, and to upload the photographs automatically to the augmented reality controller 210. When the requested sensory data is sound, the player device control mechanism 360 instructs the app on the player's device to automatically turn on the microphone and record sound for a predetermined period of time as the player plays the game, to turn off the microphone after the predetermined period of time, and to upload the resulting sound file(s) automatically to the augmented reality controller 210. The player location mechanism 370 tracks the location of all players currently playing the game, which allows the augmented reality controller 210 to direct one or more players to a specified location in a customer request 320 when the request is received.

Figures 4, 5:
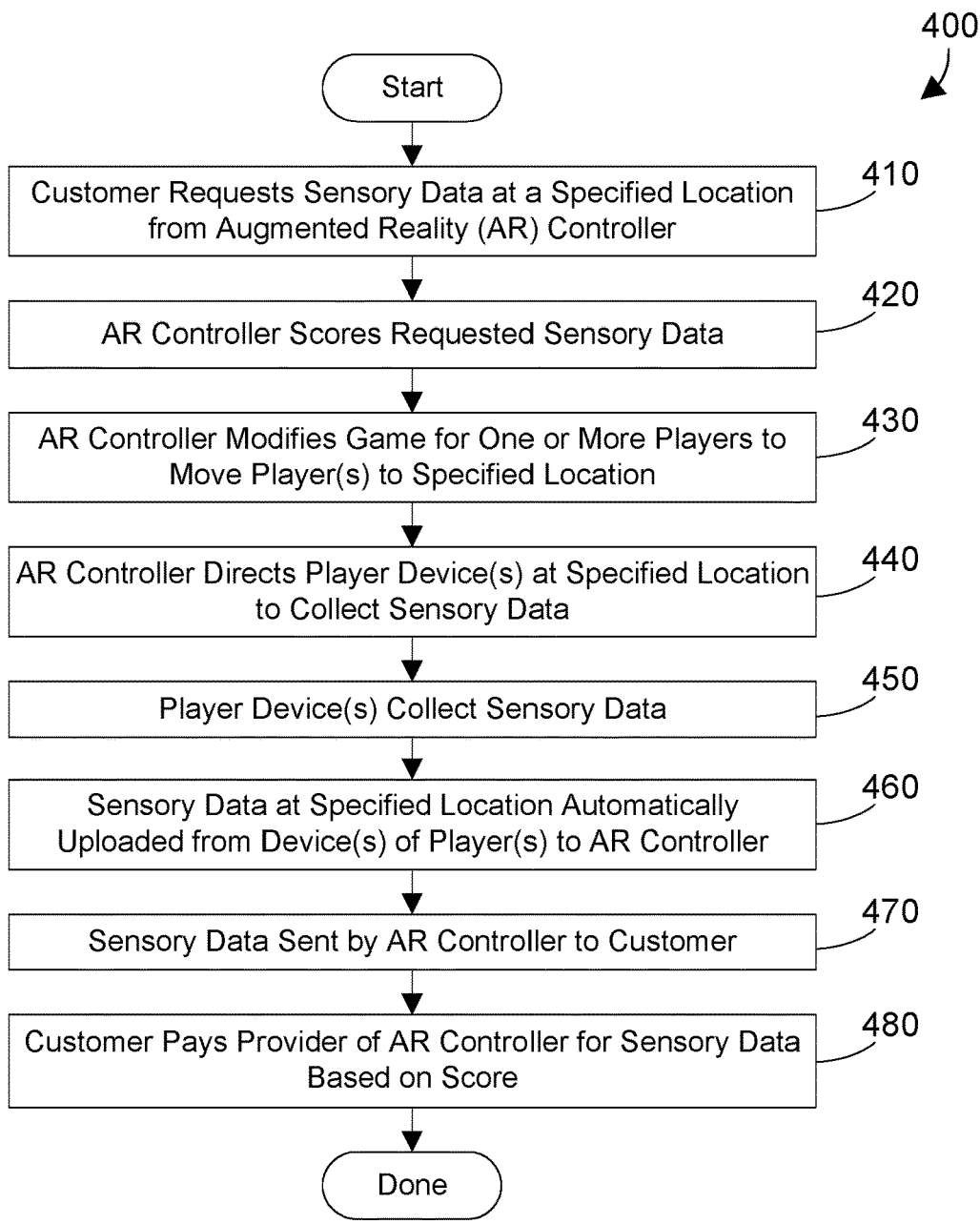
FIG. 4 is a flow diagram of a method for an augmented reality system to deliver sensory data to a customer.
FIG. 5 is a table showing one suitable form for a customer request to the augmented reality system.

Referring to FIG. 4, a method 400 illustrates steps that could be performed in the augmented reality system 200 shown in FIG. 2. A customer requests sensory data at a specified location from the augmented reality (AR) controller (step 410). The AR controller scores the requested sensory data (step 420). The AR controller modifies the game for one or more players to move the player(s) to the specified location that was specified in the customer request in step 410 (step 430). The AR controller then directs the player device(s) at the specified location to collect the sensory data (step 440). The player device(s) at the specified location then collect the sensory data (step 450). Note the collection of the sensory data in step 450 is preferably done in a manner that is transparent to the users of the player devices. Thus, as far as the user is concerned, the user is simply playing a game without realizing his device is collecting and uploading the requested sensory data. The sensory data is automatically uploaded from the device(s) to the AR controller (step 460), which sends the sensory data to the customer (step 470). In an optional step, the customer pays the provider of the AR controller for the sensory data (step 480).

Referring to FIGS. 3 and 4, we now examine the relationship between the steps in FIG. 4 and the various features of the AR controller 210 shown in FIG. 3. The customer request received in step 410 corresponds to the customer request 320, which includes request criteria 322 that includes the specified location. The customer request 320 is received by the customer request processor 310 in step 410. Step 420 is preferably performed by the score determination mechanism 330. Step 430 is preferably performed by the player movement prompt mechanism 352 in the game modification mechanism 350 prompting one or more players to move to the specified location. Step 440 is preferably performed by the player device control mechanism 360 directing one or more player devices to collect the sensory data. Step 450 is performed by the one or more player devices. Step 460 is performed by the one or more player devices uploading the sensory data to 342 in FIG. 3. Step 470 is performed by the customer transmission mechanism 340 sending the sensory data from the player device(s) 342 to the customer. While the steps in FIG. 4 are discussed above as being performed by certain features of the augmented reality controller 210 shown in FIG. 3, these are shown by way of example, and are not limiting.

FIG. 5 shows one suitable example 510 of a customer request 320 shown in FIG. 3. A customer request 510 may include any suitable request criteria 322, including without limitation requested data 520, location 530, orientation 540, quality 550, time 560 and user type or device 570. Requested data 520 may include any suitable data that a mobile device could collect. For example, known smart phones include a camera that allows capturing photos and a microphone that allows capturing audio. Smart phones in the future may include other sensors, such as light sensors, air quality sensors, etc. The disclosure and claims herein expressly extend to the collection of any form of data that can be collected by a mobile device, whether currently known or developed in the future, which all falls within the scope of the term "sensory data" as used herein. Location 530 is the specified location for collecting the sensory data. Orientation 540 specifies an orientation or direction, if applicable, for collecting the sensory data. Quality 550 specifies a desired minimum quality for the sensory data. For example, if the requested data 520 is photographs, the quality 550 could specify a minimum resolution in megapixels for the photographs. Time 560 specifies a time limit for the customer request 510, meaning the requested data should be delivered to the customer before the time limit expires. The time could be specified as a clock time deadline, or as a time limit relative to the current time such as 2 hours. User type/device 570 allows specifying a particular user type or user device. For example, a user type may be a user at a particular level of status in the augmented reality system, such as an advanced user or a premium user. User device could specify a particular type of user device, such as Android, iOS, etc.

Figure 6:
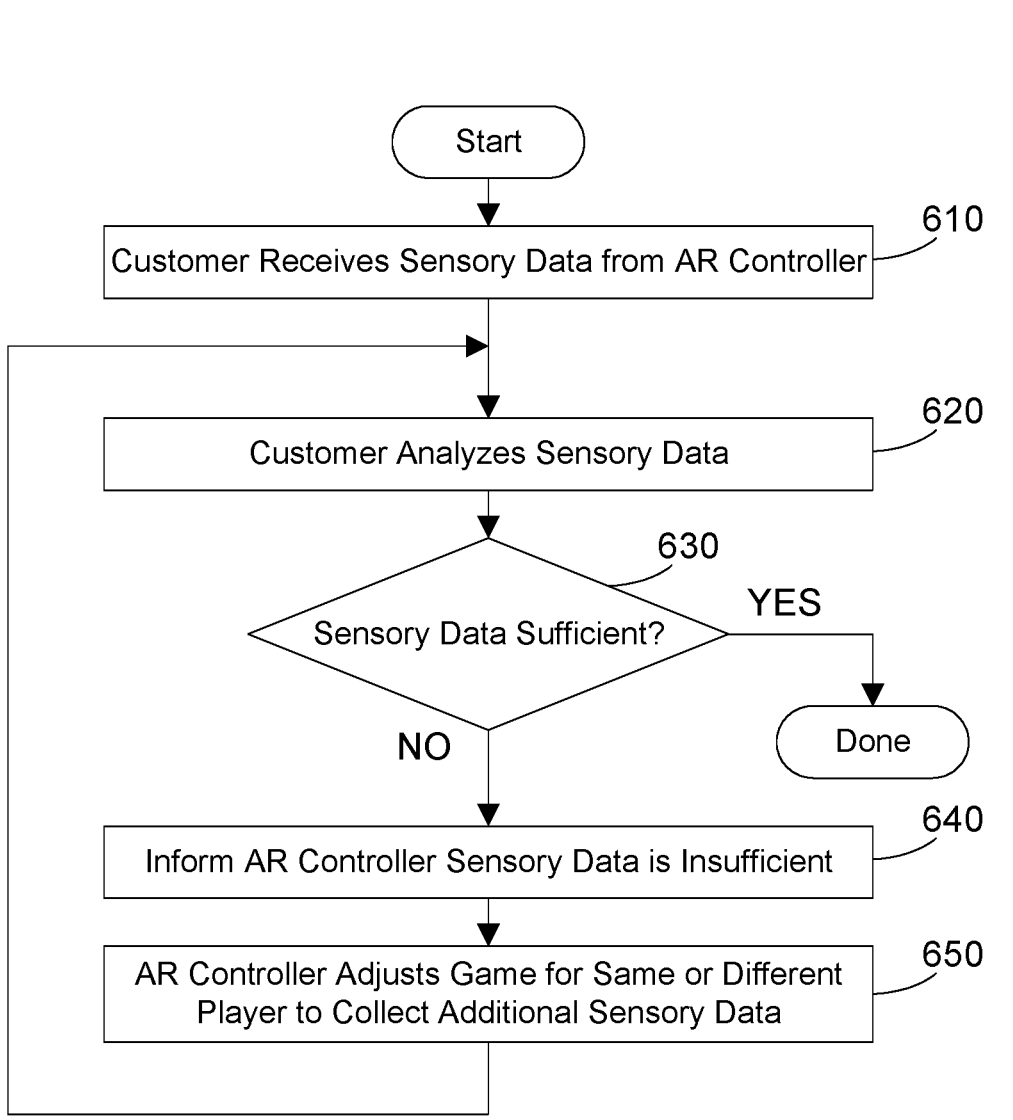
FIG. 6 is a flow diagram of a method for an augmented reality system to make adjustments when the collected sensory data is insufficient.

Referring to FIG. 6, a method 600 allows a customer to provide feedback and receive additional sensory data when the collected sensory data is insufficient. The customer receives the sensory data from the AR controller (step 610). The customer analyzes the sensory data (step 620). The analysis in step 620 can be performed by a computer system or could be analyzed manually by a human. When the sensory data is sufficient (step 630=YES), method 600 is done. When the sensory data is insufficient (step 630=NO), the customer informs the AR controller that the sensory data is insufficient (step 640). In response, the AR controller adjusts the game for the same player or for a different player to collect additional sensory data (step 650). Step 650 could be performed, by example, by the player feedback mechanism 354 in FIG. 3. Method 600 then loops back to step 620 and continues until the sensory data is sufficient (step 630=YES). Method 600 provides feedback from the customer so the customer can be sure to receive the sensory data that is sufficient for the customer's needs. Note the feedback from method 600 can be real-time. For example, if the player captured a photo but the photo is slightly blurry, the customer could indicate the sensory data is insufficient (step 630=NO) so another photo is captured by the player. In another example, if the player captured a photo that cut off an item of interest on the left edge of the photo, the indication of insufficient data in step 640 could indicate to move the player's view to the left so the entire item of interest is in a photo. The AR controller 650 could then modify the game so the computer-generated item is moved to the left, which will cause the player to move the view to the left, which will capture all of the desired item.

Figure 7:
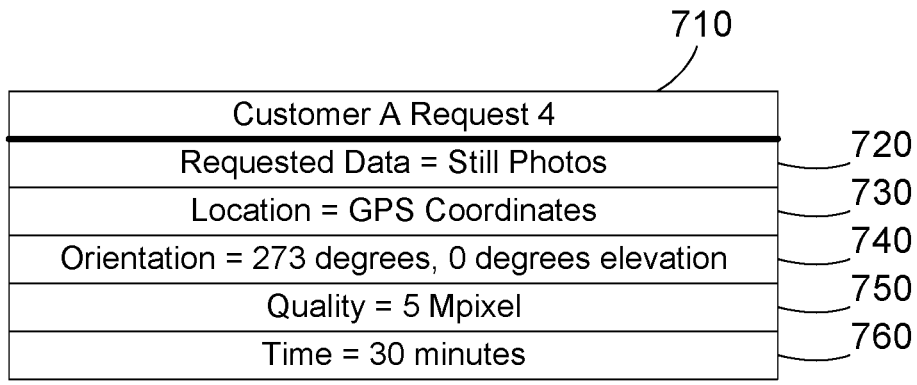
FIG. 7 is a table showing a first specific customer request to an augmented reality system.

Some specific examples are now given to illustrate the general concepts discussed above. Referring to FIG. 7, a request 710 from a customer called Customer A includes still photos as the requested data 720, a location specified by global positioning system (GPS) coordinates 730, an orientation that specifies 273 degrees with zero degrees elevation 740, a quality of 5 megapixels 750, and a time of 30 minutes 760. We assume customer A wants to determine using request 710 how long the line is outside a popular barbecue restaurant. We assume the GPS coordinates for the specified location 730 will put a player in front of the restaurant, and the orientation 740 will point the player towards the front of the restaurant. By playing the game, a user can thus capture photos of the front of the restaurant, which can be uploaded and sent to Customer A in response to the request 710 so Customer A can see in the photos how long the line is outside the restaurant.

Figure 8:
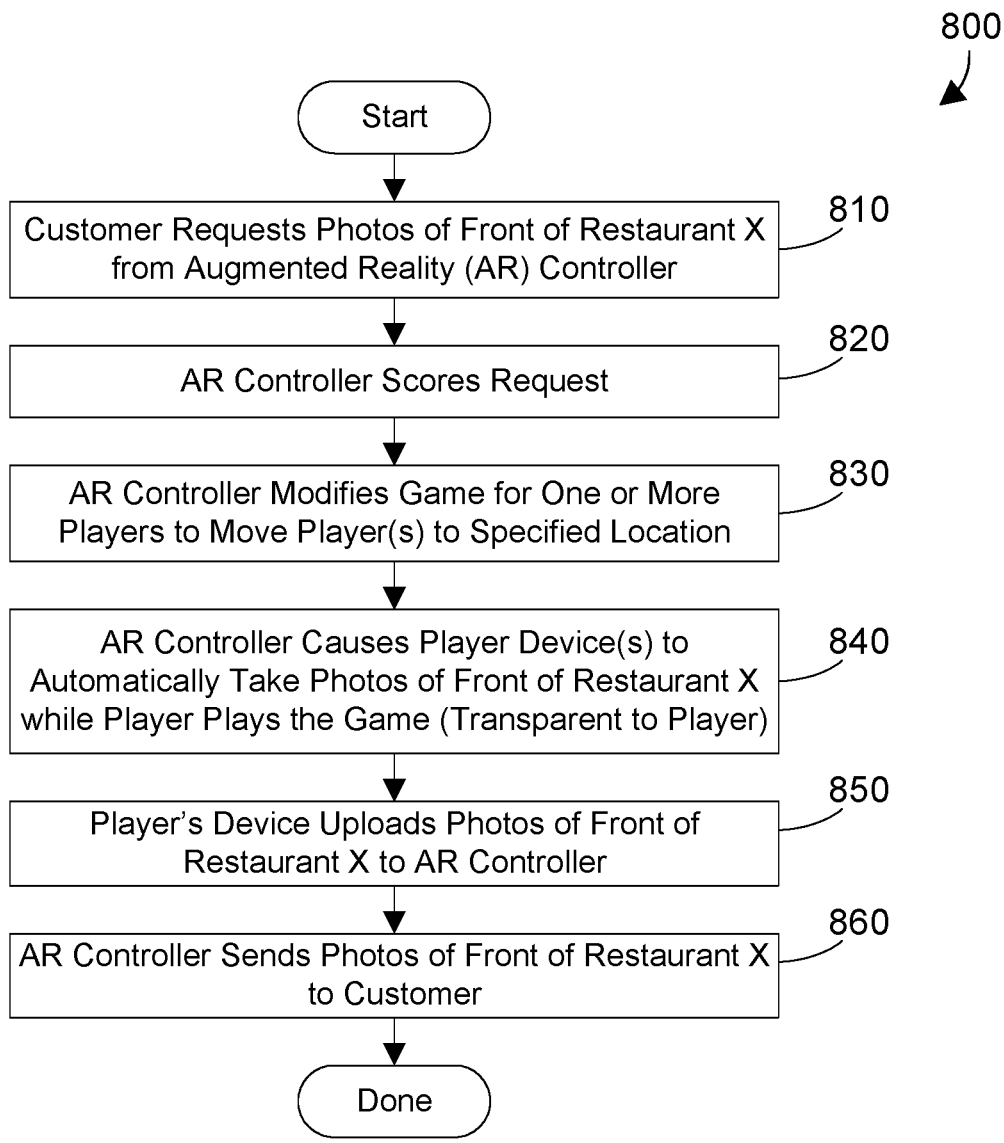
FIG. 8 is a flow diagram of a method for the augmented reality system to perform in response to receiving the request in FIG. 7.

Method 800 in FIG. 8 shows one specific method in accordance with method 400 in FIG. 4 for the specific example of Customer A requesting photos of the front of Restaurant X in the next 30 minutes. The customer requests the photos of the front of Restaurant X from the AR controller (step 810) by sending a request such as request 710 shown in FIG. 7. The AR controller scores the request (step 820). The AR controller modifies the game for one or more players to move the one or more players to the specified location (step 830). In this example, we assume a single player is directed to the GPS coordinates in the request. The AR controller causes the player's device to automatically take photos of the front of Restaurant X while the player plays the game (step 840). Step 840 is most preferably performed in a manner that is transparent to the player, meaning the player does not know and cannot tell their device is taking pictures of the front of Restaurant X and uploading those photos to the AR controller. From the player's perspective, the player is simply playing the game, and doesn't know or care about the customer request. From a practical and legal perspective, the collecting and sending of sensory data during game play should not be unknown to the user. But when the user installs the game app and first runs the game app, the user could be presented with a "terms and conditions" screen that requires the user to acknowledge and agree that during game play, their device will take and upload sensory data. In the alternative, the collection and sending of sensory data during game play could be an option on the game that a user could enable or disable according to the user's preference. Note in step 840 the AR controller will cause the player to turn in the desired orientation to face the front of the restaurant. This could be done, for example, by directing the player to turn the device until a computer-generated item is displayed in the orientation facing the front of Restaurant X. The player's device takes the photos of the front of Restaurant X in step 840, and the player's device then uploads these photos to the AR controller (step 850). The AR controller sends these photos of the front of Restaurant X to the customer (step 860). Method 800 is then done. Not shown in FIG. 8 is an optional step where the customer pays the provider of the AR controller for the photos depending on the score determined in step 820.

Figure 9:
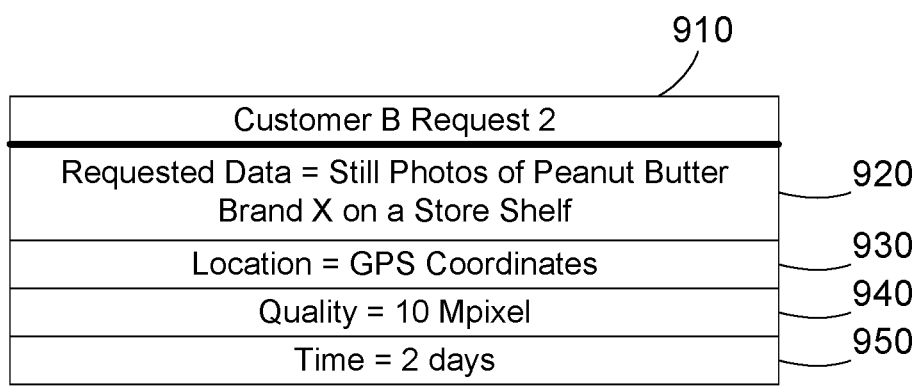
FIG. 9 is a table showing a second specific customer request to the augmented reality system.

We now consider a second example where a customer B wants to see still photos of jars of Brand X peanut butter on a store shelf. Referring to FIG. 9, a customer B request 910 specifies still photos of peanut butter Brand X on a store shelf as the requested data 920. The specified location 930 is the location of the store given in GPS coordinates. The location of the peanut butter aisle in the store could be specified once the player arrives at the store using any suitable indoor positioning technology, including without limitation Bluetooth beaconing, Wi-Fi triangulation, etc. In the alternative, the player could go to the store at the specified location 930, the activate the camera. Using computer vision techniques, the player's device could detect when Brand X peanut butter is in view. The quality is 10 megapixels 940 and the time is two days 950. Method 1000 shows steps for this specific example.

Figure 10:
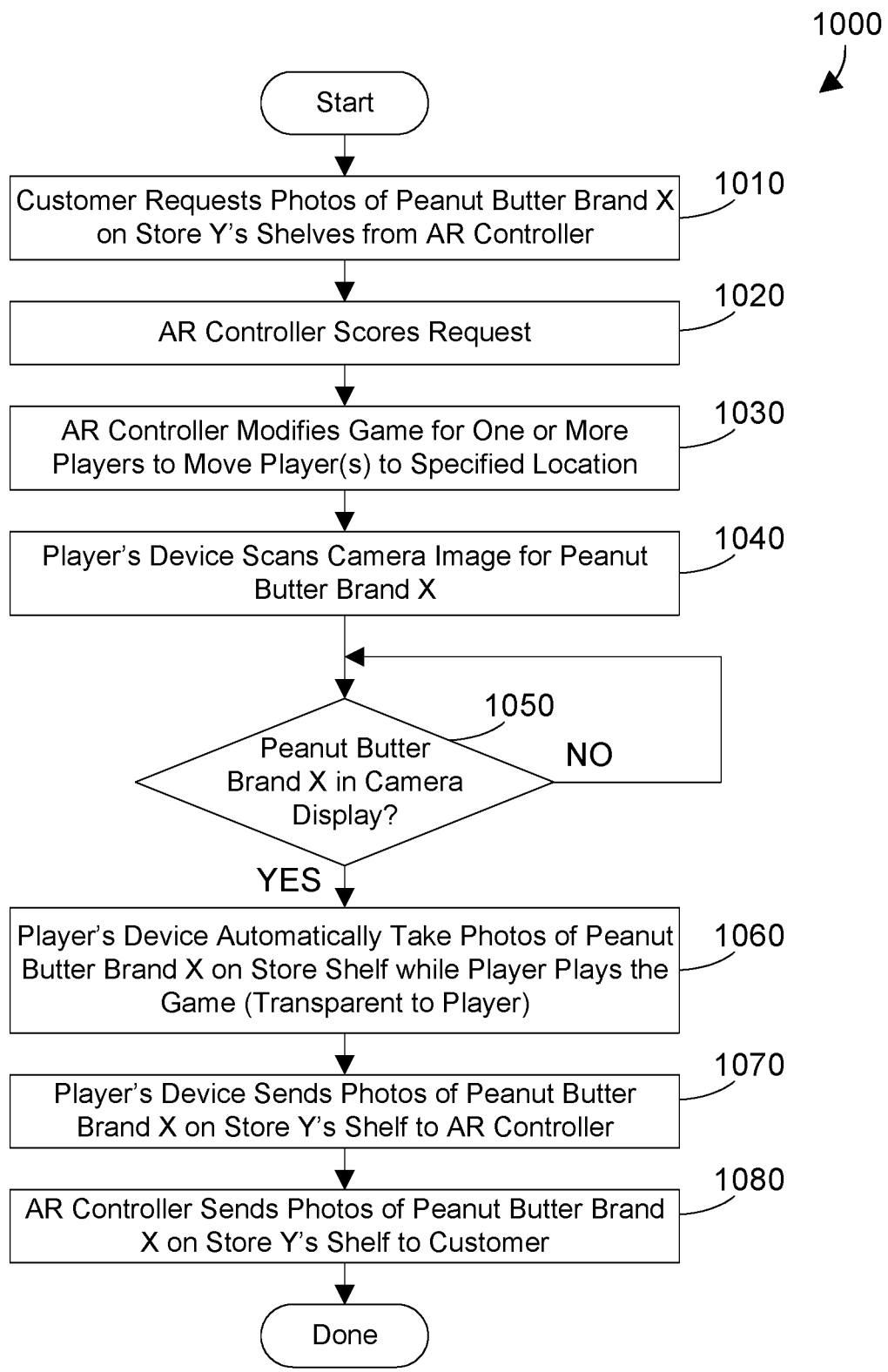
FIG. 10 is a flow diagram of a method for the augmented reality system to perform in response to receiving the request in FIG. 9.

The customer requests photos of peanut butter Brand X on Store Y's shelves from the AR controller (step 1010). The request 910 in FIG. 9 is one suitable request. The AR controller scores the request (step 1020). This can be done before or after the request is received in step 1010. In response to the request 910 received in step 1010, the AR controller modifies the game for one or more players to more one or more players to the specified location (step 1030). At this point the camera on the player's device may use text recognition to look for Brand X on the peanut butter jars. As long as peanut butter Brand X is not in the camera display (step 1050=NO), method 1000 loops back to step 1050, and the player continues game play until peanut butter Brand X is in the camera display (step 1050=YES). The player's device automatically takes photos of the peanut butter Brand X on the store shelf while the player plays the game (step 1060). Once again, the taking of photos to the AR controller is preferably transparent to the user, meaning the user has no indication that the photos are being taken. The player's device the sends the photos of the peanut butter Brand X on store Y's shelf to the AR controller (step 1070). The AR controller sends the photos of peanut butter Brand X on Store Y's shelf to the customer (step 1080). Method 1000 is then done. In an optional step not shown in FIG. 10, the customer pays the provider of the AR controller for the photos. The customer can then examine the photos and determine whether the jars of peanut butter have their labels facing out so they are easily read, can see whether there is sufficient stock of Brand X peanut butter on the store shelf, can see the placement of competitor peanut butter brands with respect to Brand X peanut butter, etc.

Figure 11:
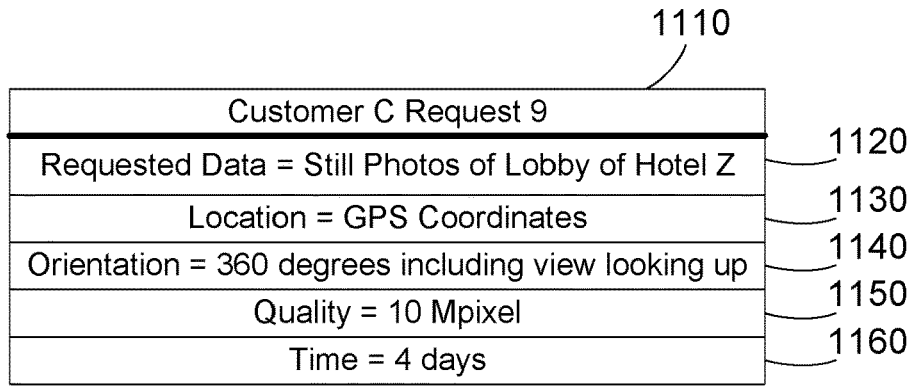
FIG. 11 is a table showing a third specific customer request to the augmented reality system.
Figure 12:
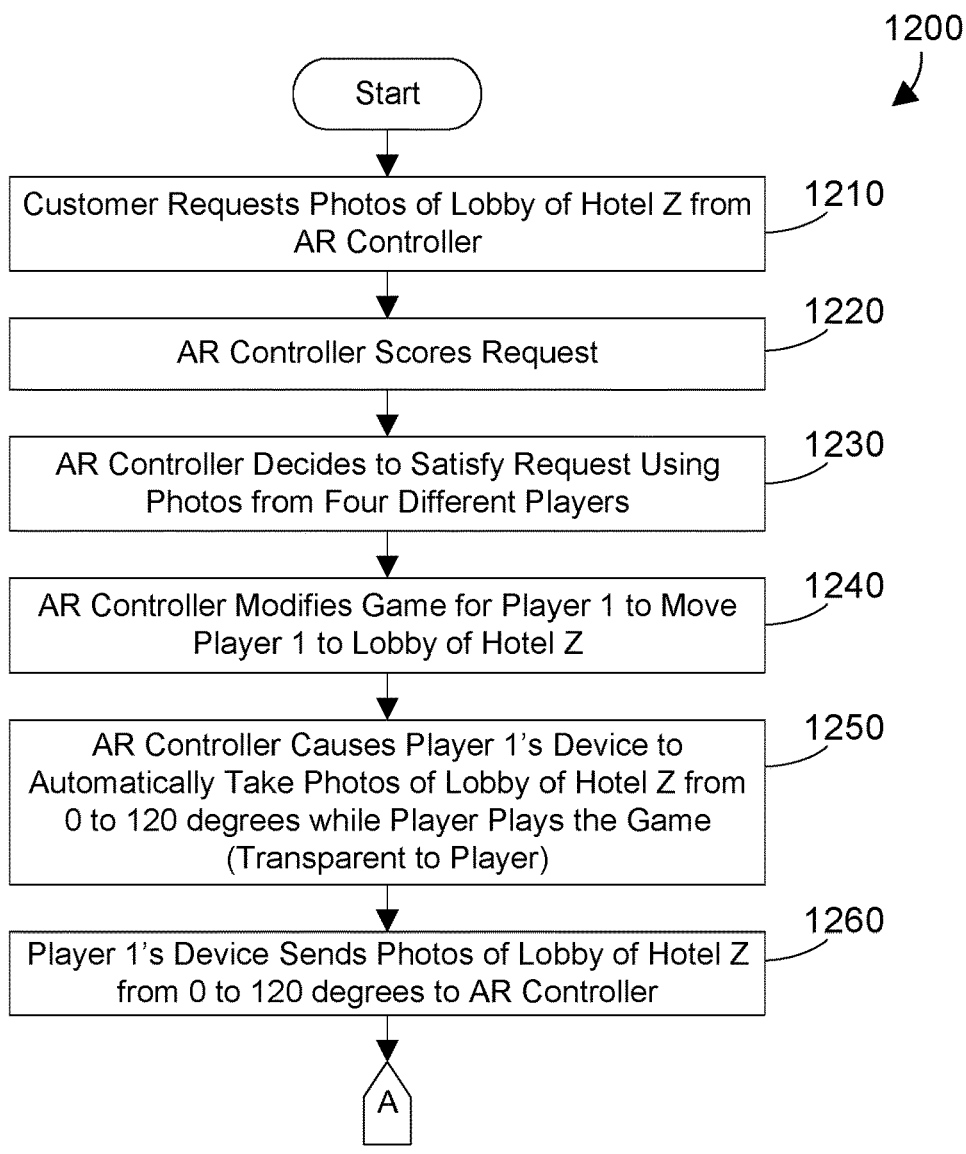
FIG. 12 is a flow diagram showing a portion of a method for the augmented reality system to perform in response to receiving the request in FIG. 11.
Figure 13:
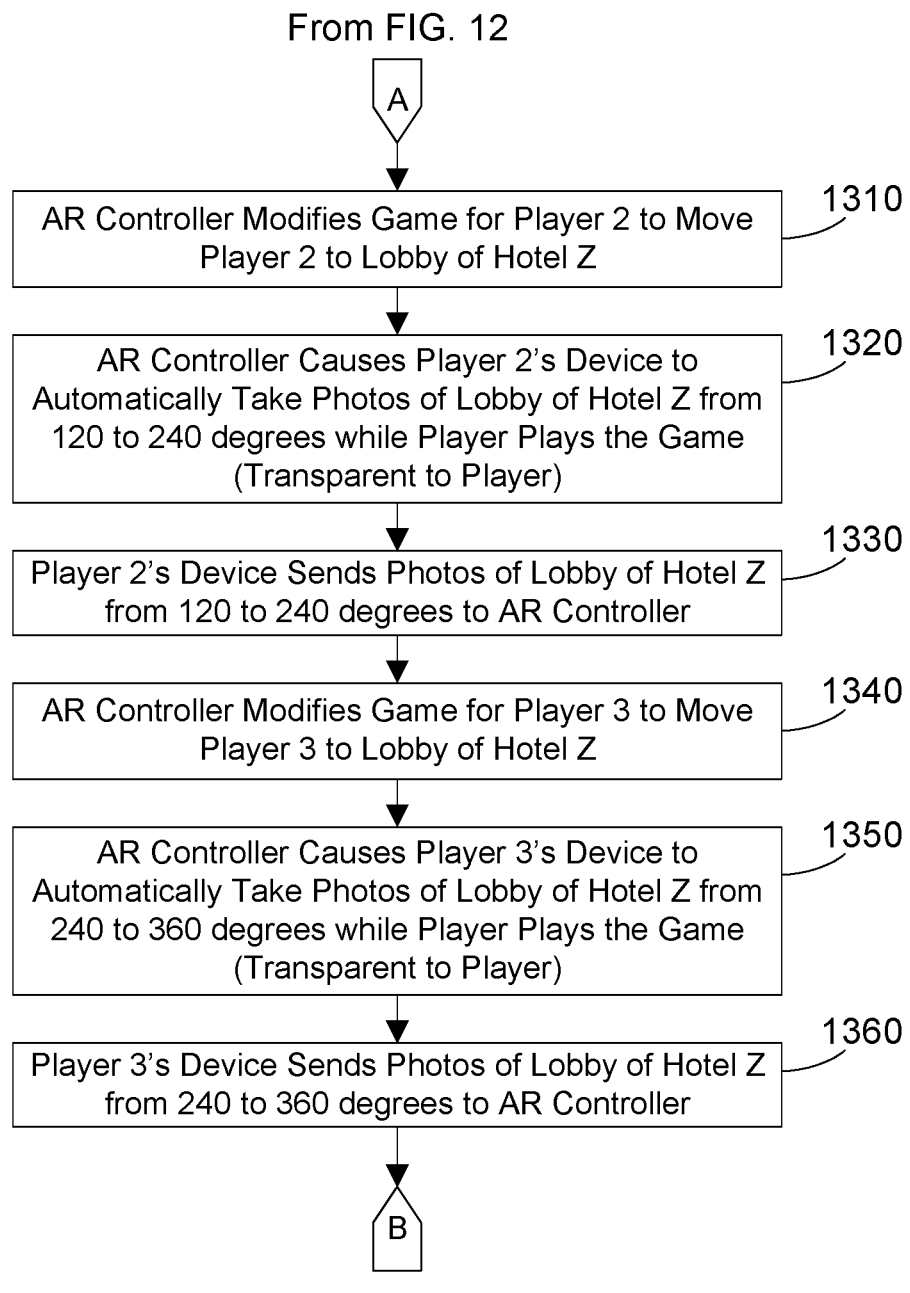
FIG. 13 is a flow diagram showing a continuation of the method in FIG. 12.
Figure 14:
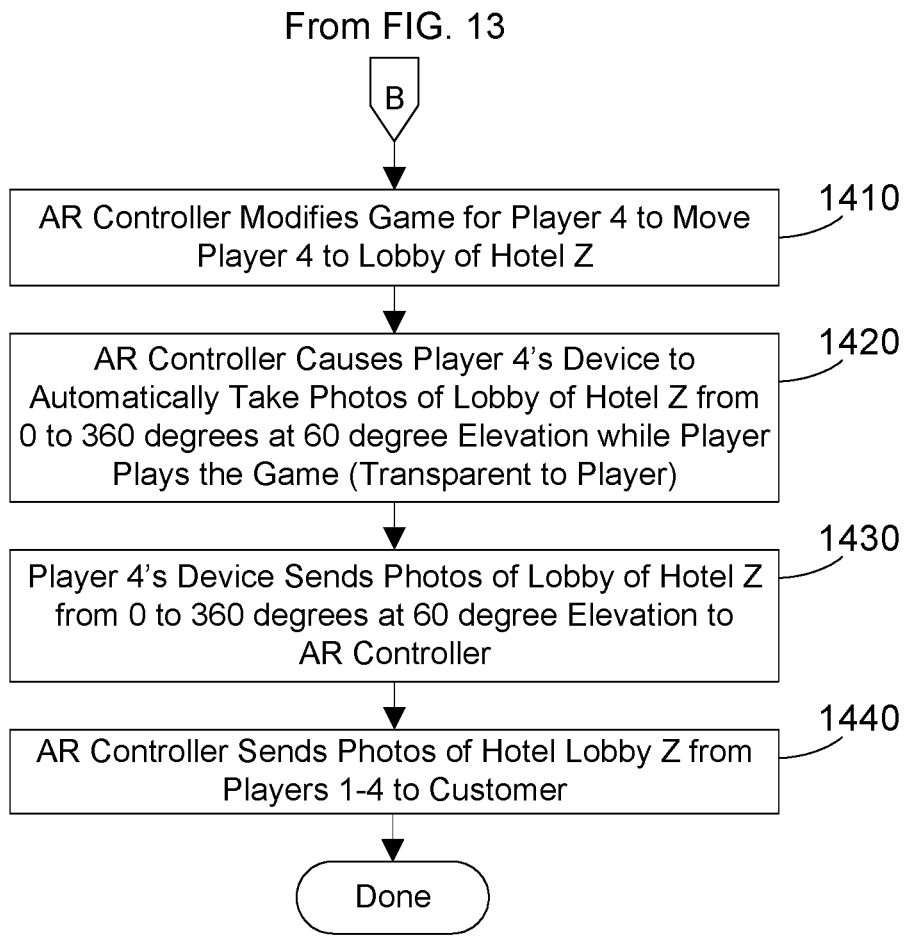
FIG. 14 is a flow diagram showing a continuation of the method in FIGS. 12 and 13.

In a third example, we assume a new luxury hotel has opened, and a customer C wants to receive many photos that show all of the lobby of the new hotel so the customer can create a 3D rendering of the lobby on the customer's website from the collected photos. A request from customer C could be request 1110 shown in FIG. 11. The requested data is still photos of the lobby of Hotel Z 1120. The specified location 1130 is given as GPS coordinates. The orientation is 360 degrees including the view looking up 1140. The quality is 10 megapixels 1150. The time is four days 1160. Method 1200 in FIGS. 12-14 illustrate one way this request could be handled. The customer sends the request 1110 in FIG. 11 to the AR controller (step 1210). The AR controller scores the request (step 1220). The AR controller decides to satisfy this request using photos from four different players. The AR controller might decide to split the request among different players, for example, to minimize the impact on the augmented reality experience for each of the four players. If the request were filled by a single user, it would require the single user to pan a full 360 degrees in the lobby and to look up and pan a full 360 degrees again, which might not be compatible with normal play of the game. So for this example, the AR controller makes the decision in step 1230 to satisfy the request using photos from four different players we will call Player 1, Player 2, Player 3 and Player 4. The AR controller modifies the game for Player 1 to move Player 1 to the lobby of Hotel Z (step 1240). The AR controller then causes player 1's device to automatically take photos of the lobby of Hotel Z from 0 to 120 degrees while the player plays the game (step 1250), in a manner that is preferably transparent to the player. Player 1's device sends the photos of the lobby of Hotel Z from 0 to 120 degrees to the AR controller (step 1260). At this point method 1200 continues at step 1310 in FIG. 13. The AR controller modifies the game for Player 2 to move Player 2 to the lobby of Hotel Z (step 1310). The AR controller causes Player 2's device to automatically take photos of the lobby of Hotel Z from 120 to 240 degrees while the player plays the game (step 1320), in a manner that is preferably transparent to the player. Player 2's device then sends the photos of the lobby of Hotel Z from 120 to 240 degrees to the AR controller (step 1330). The AR controller then modifies the game of Player 3 to move Player 3 to the lobby of Hotel Z (step 1340). The AR controller causes Player 3's device to automatically take photos of the lobby of Hotel Z from 240 to 360 degrees while the player plays the game (step 1350), in a manner that is preferably transparent to the player. Player 3's device then sends the photos of the lobby of Hotel Z from 240 to 360 degrees to the AR controller (step 1360). Method 1200 then continues at step 1410 in FIG. 14. The AR controller modifies the game for Player 4 to more Player 4 to the lobby of Hotel Z (step 1410). The AR controller causes Player 4's device to automatically take photos of the lobby of Hotel Z from 0 to 360 degrees at a 60 degree elevation while the player plays the game (step 1420), in a manner that is preferably transparent to the player. Player 4's device sends the photos of the lobby of Hotel Z from 0 to 360 degrees at a 60 degree elevation to the AR controller (step 1430). The AR controller now has all the photos to satisfy the request from all four players, and therefore sends the photos of hotel lobby Z from all four players to the customer (step 1440). Method 1200 is then done. An optional step not shown in method 1200 is the customer pays the provider of the AR controller for the photos. Method 1200 illustrates how the AR controller can divide up a request to be satisfied by multiple players. This could be done, for example, to minimize the impact on the augmented reality experience of each user. Note the timing in method 1200 is shown by way of example for the sake of illustration. The AR controller could modify games for all four players at the same time. In the alternative, the AR controller could space apart the time for modifying the games for the four players over the specified four day time 1160 so the impact on the game play of all players is minimized. In this example, instead of collecting and uploading series of still photos, videos could be collected and uploaded, since videos are basically a series of still photos in time sequence.

Figure 15:
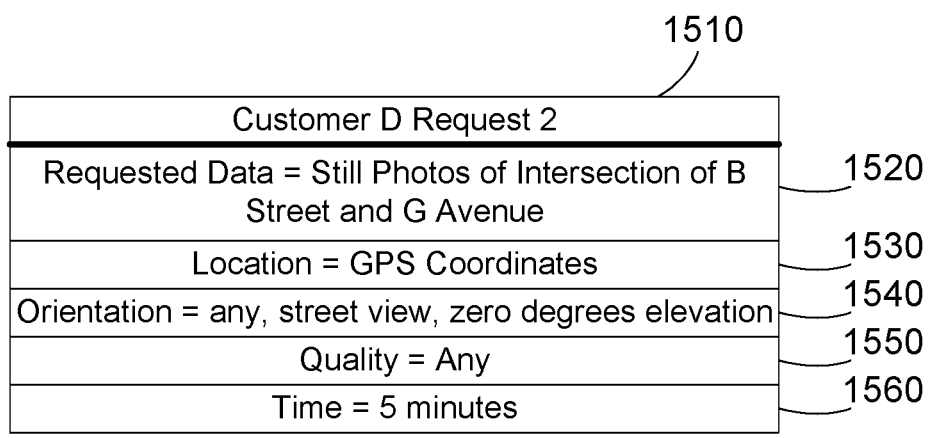
FIG. 15 is a table showing a fourth specific customer request to the augmented reality system.

In a fourth example, we assume a customer D provides traffic data real-time, and determines an accident has happened at the intersection of B street and G avenue. To provide an estimate of how long it will take to clear the intersection of the accident, Customer D could send a request 1510 as shown in FIG. 15. The requested data is still photos of the intersection 1520. The location of the intersection is given in GPS coordinates 1530. The orientation could be any orientation, at street view, meaning zero degrees elevation 1540. This means any player could approach the intersection from any direction, as long as photos of the intersection can be taken. The quality is Any 1550, meaning the resolution of the photos is not important. The time is five minutes 1560, which means the customer must receive the photos in the next five minutes in order to provide a better estimate of when the accident will be cleared. Note that having a short time limit like 5 minutes 1560 might cost extra according to a prearranged fee schedule, or according to a real-time bid for the photos. Once customer D receives the photos of the intersection, an estimate may be made regarding how soon the accident might be cleared from the intersection.

The examples in FIGS. 7-15 illustrate the versatility of the AR system 200 shown in FIG. 2. A customer could receive photos very quickly if needed, as shown in request 1510 in FIG. 15. A customer could receive a large number of photos that cover a large view, which could be spaced over a number of days, as shown in request 1110 in FIG. 11 and corresponding method 1200 in FIGS. 12-14. The augmented reality controller has the option of splitting a request among multiple players, as shown in method 1200 in FIGS. 12-14. Text or feature recognition could be used to collect the needed photos, as shown in step 1050 in FIG. 10.

Figure 16:
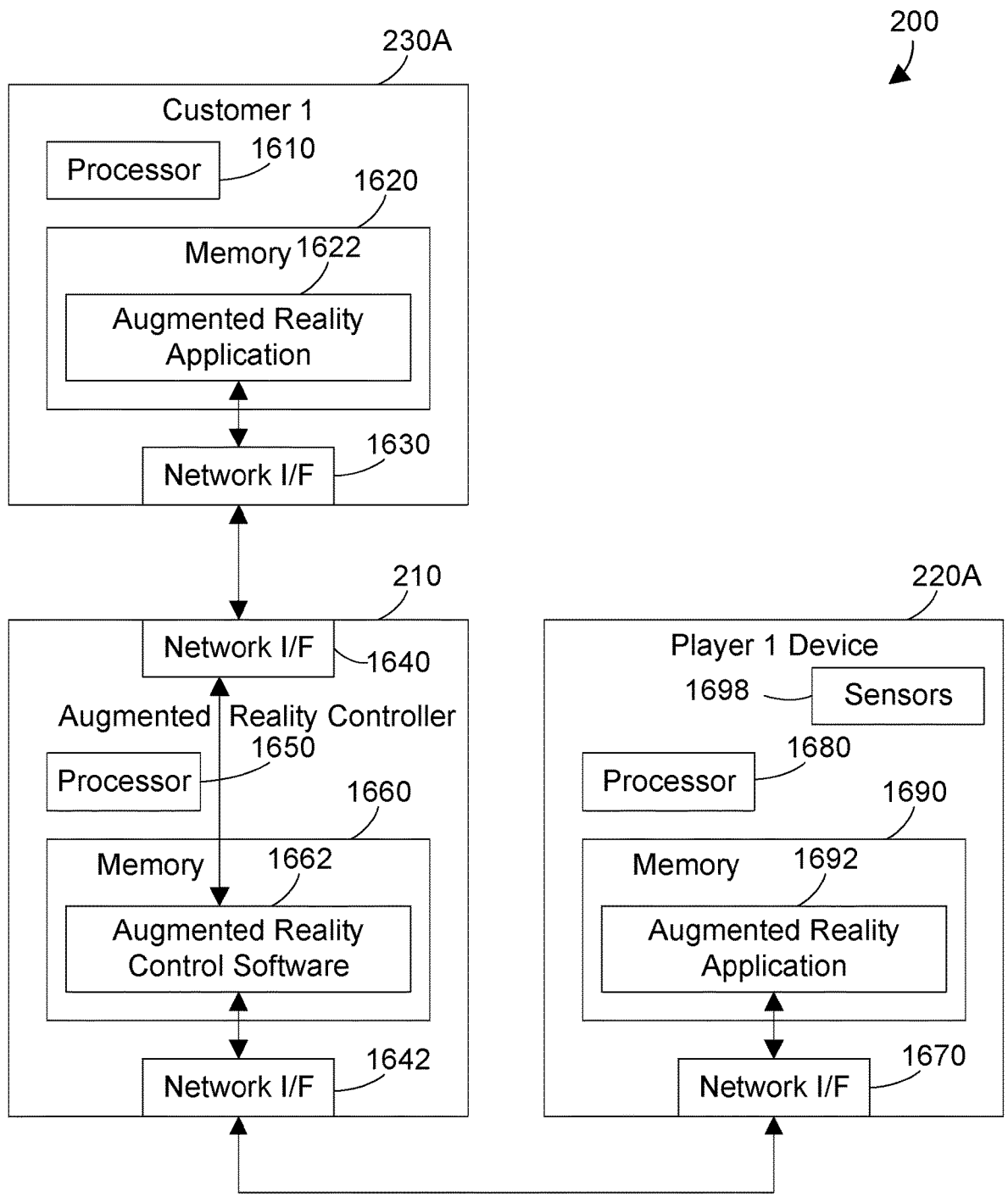
FIG. 16 is a block diagram showing some of the hardware and software aspects of the systems for the customer, augmented reality controller and player devices.

Referring to FIG. 16, various features of the augmented reality system 200 shown in FIG. 2 are shown in more detail. Customer 1 230 A is preferably a computer system that includes a processor 1610, a memory 1620, and a network interface 1630. The memory 1620 includes an augmented reality application 1622 that allows the customer to send requests to the augmented reality controller 210 via the network interface 1630 and allows the customer to receive the requested sensory data from the augmented reality controller 210 via the network interface 1630.

The augmented reality controller 210 is a computer system that preferably includes a network interface 1640 for communicating with the computer system for customer 1 230A, a processor 1650, a memory 1660, and a network interface 1642 for communicating with multiple player devices. Note that network interface 1640 and network interface 1642 could be the same network interface, or could be separate network interfaces. The memory 1660 includes augmented reality control software 1662 which performs the functions of the augmented reality controller 210 discussed in detail above. Player 1 device 220A is preferably a mobile device such as a smart phone, a tablet computer, a smart watch, smart glasses, etc. Player 1 device 220A includes a processor 1680, a memory 1690, and a network interface 1670 that allows the player 1 device 220A to communicate with the augmented reality control software 1662 in the augmented reality controller 210. The memory 1690 includes an augmented reality application 1692 that provides an augmented reality experience to the player by interacting with the augmented reality control software 1662 via network interface 1670. The augmented reality application 1692 can receive sensory data from one or more sensors 1698 on the player device 220A, which may include a microphone, a camera, an air quality sensor, or any other suitable sensor. The augmented reality application 1692 provides an augmented reality experience for the user by augmenting the user's perception with computer-generated input, such as placing a computer-generated character on a camera screen.

The customer 1 computer system 230A and the augmented reality computer system 210 could be any suitable computer system, including without limitation a desktop computer system, a laptop computer system, a tablet computer, a phone, or an embedded control system. Player 1 device 220 may be any suitable mobile device, including without limitation a laptop computer system, a tablet computer, a phone, a smart watch, smart glasses, or an embedded control system. It is understood that the memories 1620, 1660 and 1690 each contain an operating system that is software that controls the function of the respective computer system or device.

Processors 1610, 1650 and 1680 may be constructed from one or more microprocessors and/or integrated circuits. Processors execute program instructions stored in their respective memories. The memories stores programs and data that the respective processors may access. When each computer system or device starts up, its respective processor initially executes program instructions that make up an operating system. Processor 1610 executes the augmented reality application 1622 under control of its operating system. Similarly, processor 1650 executes the augmented reality control software 1662 under control of its operating system, and processor 1680 executes the augmented reality application 1692 under control of its operating system.

Network interfaces 1630, 1640, 1642 and 1670 are used to connect computer systems and devices together. Network interfaces 1630, 1640, 1642 and 1670 broadly represent any suitable way to interconnect electronic devices, regardless of whether the network comprises present-day analog and/or digital techniques or via some networking mechanism of the future. Network interfaces 1630, 1640, 1642 and 1670 preferably includes a combination of hardware and software that allows communicating on the network. Software in the network interfaces preferably includes a communication manager that manages communication with other computer systems and devices on a network using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within a network interface. In one suitable implementation, the network interfaces 1630, 1640, 1642 and 1670 are Ethernet interfaces that can communicate on a wired or wireless network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The specific customer requests shown in FIGS. 7, 9, 11 and 15 are specific examples of the customer request 510 shown in FIG. 5. Similarly, the methods shown in FIGS. 8, 10 and 12-14 are specific examples of method 400 shown in FIG. 4.

The examples herein most preferably collect the requested sensory data in a manner that is transparent to the player, meaning the player is not even aware the sensory data is being collected and transmitted to the augmented reality controller. This means the player can focus on playing the game. The player's experience will necessarily be altered from what it would otherwise be without the request, but this alteration is done within defined game parameters that minimize the impact on the augmented reality experience of the player. There are times, such as when a request with a short time limit as shown in FIG. 1510 is received, when the gaming experience may be compromised to a greater degree in order to satisfy the request. This means the player experience may be more significantly impacted, and may not be as transparent, when there is a rush to collect the requested data. However, in most instance, the preferred implementations is to minimize the impact on the player's augmented reality experience such that the user is unaware the requested data is being collected and transmitted to the augmented reality server, making the collection and transmission of the requested data transparent to the user.

Note that functions not described in the examples above could be implemented. For example, if photos of 5 megapixels are requested and a smart phone has a 20 megapixel camera, the augmented reality application 1692 on the player device 220A (see FIG. 16) could modify the 20 megapixel photos down to 5 megapixels to save time and bandwidth. The disclosure and claims herein expressly extend to any suitable functions that could be performed by the augmented reality application 1622, the augmented reality control software 1662, and the augmented reality application 1692 shown in FIG. 16.

The four specific examples disclosed herein use the collection of photos using the camera of a mobile device. Note, however, this is shown by way of illustration, and is not limiting. As discussed above, the disclosure and claims herein extend to the collection of any suitable data by a mobile device, whether currently known or developed in the future. For example, let's assume a city receives complaints about the noise level of a construction zone. The city could send a request to receive an audio clip of the noise level, which would result in a player going into the area of the construction zone, activating the microphone on the player's device for some specified time period, and sending the resulting audio file to the city. Of course, numerous other examples fall within the disclosure and claims herein, which expressly extend to the collection of any suitable sensory data by a user device.

The discussion and examples herein are all in the context of an augmented reality gaming system. Note, however, the disclosure and claims expressly extend to any augmented reality system. For example, a person could have an augmented reality tour guide that superimposes notes on a camera display, or provides audio clips to explain what the person is looking at through the camera display. The disclosure and claims are not limited to an augmented reality gaming system.

An augmented reality system that collects sensory data from one or more user devices in a manner that is transparent to the user's augmented reality experience. A customer of an augmented reality system requests sensory data at a specified location. The augmented reality system modifies the augmented reality experience for one or more users to move someone to the specified location. The user device(s) collect the sensory data at the specified location in a manner that is transparent to the augmented reality experience of the user(s). The sensory data is uploaded from the user device(s) to the augmented reality system, which sends the sensory data to the customer. The augmented reality system can charge the customer according to a score of the request. The augmented reality system can thus provide a new revenue stream to the provider of the augmented reality system by selling sensory data to customers by adjusting the augmented reality experience of one or more users to collect the requested sensory data.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a network interface coupled to the at least one processor; and
   an augmented reality controller residing in the memory and executed by the at least one processor, the augmented reality controller controlling a plurality of mobile devices coupled via the network interface to the augmented reality controller to provide an augmented reality game to a plurality of users, the augmented reality controller receiving from a customer that is not one of the plurality of users a request for at least one photograph at a specified location, generating a score for the request, altering play of the augmented reality game to direct at least one of the plurality of the mobile devices to the specified location as part of playing the augmented reality game, directing the at least one mobile device to collect the at least one photograph specified in the request using a camera on the at least one mobile device in a manner that is transparent to a user of the at least one mobile device playing the augmented reality game, uploading the collected at least one photograph, sending the collected at least one photograph to the customer in response to the request, and receiving payment for the collected at least one photograph from the customer based on the score.

2. The apparatus of claim 1 wherein the augmented reality controller provides a computer-generated character on a display of the camera to provide the augmented reality game.

3. The apparatus of claim 1 wherein the augmented reality controller directs the plurality of mobile devices to each collect one or more photographs specified in the request, wherein uploading the collected at least one photograph comprises uploading the one or more photographs from each of the plurality of mobile devices.

4. The apparatus of claim 1 wherein the request for the at least one photograph at the specified location from the customer further specifies an orientation, a quality for the at least one photograph, and a time.

5. The apparatus of claim 1 wherein the customer analyzes the collected at least one photograph and determines the collected at least one photograph is insufficient, and in response, the customer notifies the augmented reality controller the collected at least one photograph is insufficient, which causes the augmented reality controller to adjust the augmented reality game for at least one of a plurality of players to collect one or more additional photographs that are sent to the customer.

6. A computer-implemented method executed by at least one processor, the method comprising:
   controlling a plurality of mobile devices to provide an augmented reality game to a plurality of users;
   receiving from a customer that is not one of the plurality of users a request for at least one photograph at a specified location;
   determining a score for the request;
   altering play of the augmented reality game to direct at least one of the plurality of the devices to the specified location as part of playing the augmented reality game;
   directing the at least one device to collect the at least one photograph specified in the request using a camera on the at least one mobile device in a manner that is transparent to a user of the at least one mobile device playing the augmented reality game;
   uploading the collected at least one photograph;
   sending the collected at least one photograph to the customer in response to the request; and
   receiving payment for the collected at least one photograph from the customer based on the score of the request.

7. The method of claim 6 further comprising providing a computer-generated character on a display of the camera to provide the augmented reality game.

8. The method of claim 6 wherein directing the at least one device to collect the at least one photograph specified in the request comprises directing the plurality of mobile devices to each collect a portion of the sensory data specified in the request, wherein uploading the collected at least one photograph comprises uploading the portion of the at least one photograph from each of the plurality of mobile devices.

9. The method of claim 6 wherein the request for at least one photograph at the specified location from the customer further specifies an orientation, a quality for the sensory data, and a time.

10. The method of claim 6 further comprising the customer analyzing the collected at least one photograph and determining the collected at least one photograph is insufficient, and in response, the customer sending a message indicating the collected at least one photograph is insufficient, and in response, adjusting the augmented reality game for at least one of a plurality of players to collect one or more additional photographs, and sending the one or more additional photographs to the customer.

11. A networked computer system comprising:
- a first computer system comprising a customer computer system;
- a second computer system coupled via first network connection to the first computer system;
- a plurality of mobile devices coupled via second network connection to the second computer system, each of the plurality of mobile devices comprising a camera;
- wherein the second computer system comprises an augmented reality controller that controls the plurality of mobile devices to provide an augmented reality game comprising a computer-generated character on a display of the camera, the augmented reality controller receiving from the customer computer system a customer request for a plurality of photographs at a specified location, the customer request comprising the specified location, an orientation, a specified resolution for the plurality of photographs, and a time for fulfilling the customer request, the augmented reality controller determining a score for the customer request, directing the plurality of the mobile devices to the specified location, directing each of the plurality of mobile devices to automatically take a plurality of photographs to fulfill a portion of the plurality of photographs in the customer request in a manner that is transparent to the users of the mobiles device playing the augmented reality game, uploading the plurality of photographs from each of the plurality of mobile devices, sending all of the plurality of photographs from all of the plurality of mobile devices to the customer in response to the customer request, and receiving payment for fulling the customer request from the customer based on the score for the customer request.

* * * * *